United States Patent [19]

Lindroos

[11] Patent Number: 4,965,409

[45] Date of Patent: Oct. 23, 1990

[54] CABLE ENTRY CONNECTION OF AN ELECTRIC POWER CABLE TO A SUBMERSIBLE MACHINE

[75] Inventor: Helge Lindroos, Jarfalla, Sweden

[73] Assignee: Flygt AB, Solna, Sweden

[21] Appl. No.: 388,788

[22] Filed: Aug. 1, 1989

[30] Foreign Application Priority Data

Oct. 10, 1988 [SE] Sweden ............................ 8803579

[51] Int. Cl.$^5$ ................. H02G 15/013; H02K 5/132
[52] U.S. Cl. ................. 174/65 SS; 174/18;
  277/12; 277/105; 277/123; 277/187; 310/87
[58] Field of Search ............ 174/18, 65 SS, 77 R,
  174/151; 310/87, 88; 417/422; 277/4, 12, 102,
  105, 106, 110, 111, 112, 114, 115, 116, 123, 125,
  167.3, 167.5, 187; 285/138, 336, 348

[56] References Cited

U.S. PATENT DOCUMENTS

| | | | |
|---|---|---|---|
| 223,835 | 1/1880 | Boyle | 285/336 |
| 2,260,542 | 10/1941 | Shaffer | 284/348 X |
| 2,673,301 | 3/1954 | Richter | 310/87 X |
| 2,703,371 | 3/1955 | Wightman | 310/87 |

FOREIGN PATENT DOCUMENTS

| | | | |
|---|---|---|---|
| 912883 | 6/1954 | Fed. Rep. of Germany | 277/4 |
| 944616 | 6/1956 | Fed. Rep. of Germany | 174/151 |
| 3010829 | 10/1981 | Fed. Rep. of Germany | 277/4 |
| 169859 | 12/1959 | Sweden | 174/77 R |
| 326234 | 7/1970 | Sweden | |
| 954809 | 4/1964 | United Kingdom | 174/65 SS |

*Primary Examiner*—Laramie E. Askin
*Attorney, Agent, or Firm*—Menotti J. Lombardi

[57] ABSTRACT

A cable (1) entering a submersible machine, such as an electrically driven pump, a turbine etc., is surrounded by a collar (3) of a rigid material, and the collar (3) is secured to the machine shell (2) by bolts (4). Two sockets (5) and (6) of an elastic material surround the cable (1), one of them mounted in the shell (2) and the other in the collar (3). A ring (8) of a rigid material is arranged between the two sockets (5) and (6). The collar (3), during mounting, is moved towards and into contact with the shell (2), thereby causing the sockets (5) and (6) to be compressed axially and expanded radially so that the cable (1) is secured and sealed.

3 Claims, 1 Drawing Sheet

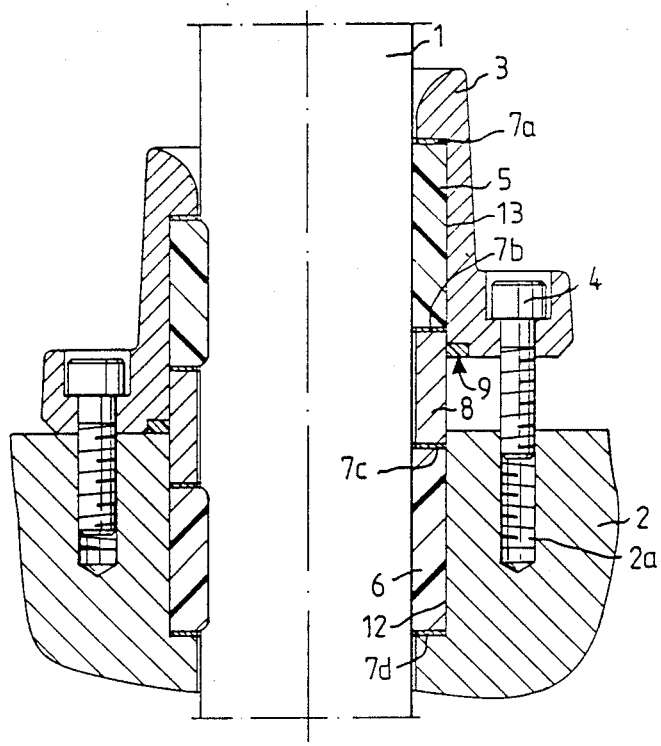

CABLE ENTRY CONNECTION OF AN ELECTRIC POWER CABLE TO A SUBMERSIBLE MACHINE

BACKGROUND OF THE INVENTION

The invention relates to a cable entry connection of an electric power cable to a submersible machine such as an electrically driven pump or a turbine generator.

Submersible machines of the above-mentioned type comprise a sealed motor to which electric power is coupled or a generator from which electric power is received by means of a cable. Since no liquid is allowed to enter the machine, there are great demands on the cable entry, especially as the cable is often subject to repeated bending and stretching within the area of the entry. As the stretching force on the cable may be significant, the grip around the cable must be sufficiently firm, but not cause damage.

Sealing and retention of the cable has previously been done by means of a socket of an elastic material, such as rubber, and a metallic clamping device. An example of such arrangement is shown in the Swedish Patent No. 326 234.

A main disadvantage with this previous arrangement is that the clamping device does not apply a symmetrical grip on the cable, which may cause cable damage.

Another means of obtaining a completely water tight cable entry is to embed the electric conductors in an insulating material. An example of such a solution is shown in GM 82187630. This arrangement provides good sealing but is relatively expensive and it is very difficult to implement in the field if repair is needed.

The purpose of this invention is to solve the problems mentioned above by providing a cable entry which meets the requirements for sealing and for clamping.

SUMMARY OF THE INVENTION

An object of the invention is to provide an improved cable entry into a submersible machine.

According to the broader aspects of the invention, the cable entry includes two sockets of an elastic material which during mounting are compressed axially and expand radially to secure and seal the cable.

BRIEF DESCRIPTION OF THE DRAWING

Other objects and features of the invention will become apparent by reference to the following description taken in conjunction with the accompanying sole drawing figure which is a cross-sectional view of the cable entry according to the invention.

DETAILED DESCRIPTION OF THE PREFERRED EMBODIMENT

With reference to the drawing, a cable 1 is fed through a wall or shell 2 forming part of an electric motor or the like. The cable is sealed through the wall by a cable collar 3, bolts 4, elastic socket means 5 and 6, pressure discs 7a–d, an intermediate ring 8 and an O-ring 9.

The wall or the shell 2 and the collar 3 are provided with enlarged holes 12, 13, respectively, for the cable 1. Holes 12, 13 have diameters larger than the diameter of cable 1. When mounting the cable, elastic sockets 5 and 6 are positioned within said enlarged holes 12, 13, one in the shell 2 and one in the collar 3. The outer diameters of said sockets correspond with the diameters of the enlarged holes 12, 13 in the shell and the collar. The inner diameters of said sockets 5 and 6 somewhat exceed the diameter of the cable 1. Between the sockets 5 and 6 is a ring 8 of a rigid material, having an outer diameter somewhat smaller than that of the sockets 5 and 6. The cable 1 is fed through the sockets 5, 6, ring 8 and discs 7a–7d.

The length of sockets 5 and 6, the ring 8, as well as the lengths of the enlarged holes 12, 13 in the shell 2 and the collar 3 are dimensioned so that the cable collar 3 will be positioned at a predetermined certain distance from the shell 2, as shown in the right half of the drawing.

When the cable 1 has been connected to the machine, bolts 4 are placed in the collar 3 and are screwed into threads 2a in the shell 2. The collar 3 is then moved towards the shell 2 and the bolts are tightened until collar 3 comes into contact with the shell 2 as shown in the left half of the drawing.

Because of the movement of the collar 3, the elastic sockets 5 and 6 will be compressed axially and expanded radially. sockets 5 and 6 grip around the cable 1 to fix and seal it in the shell and in the collar. By predetermining the length of sockets 5, 6 and the holes 12, 13, a suitable compression and expansion of sockets 5, 6 occurs to firmly grip around the cable when the collar is in contact with the shell.

The ring 8 of a non-elastic material prevents the sockets from expanding into the gap between the shell and the collar during the initial step of mounting, as shown in the right half of the drawing.

In collar 3, there is arranged on O-ring seal 9, which effectively prevents any leakage in the event either of the sockets 5, 6 should be damaged.

Pressure discs 7a–d are arranged between the end surfaces of the sockets 5, 6 and the ring 8 surfaces. The discs 7a–d and the sockets 5, 6 may be designed for several different cable diameters, so that the same cable collar 3 and shell 2 may be used.

According to the foregoing description invention a lot of advantages have been obtained in comparison with earlier arrangements for sealing and clamping of cables. The gripping of the cable is now symmetrical, which considerably eliminates the risk for damaging the cable. The amount of gripping can be predetermined by dimensioning of the sockets, since the collar is always fastened into contact with the shell, In the known cable entry arrangements, the tightening torque is dependent on the assembler of the device, which allows for a too tight or a too loose cable entry grip. The two separate sockets 5 and 6 provide double security for sufficient sealing and clamping, even if one of them should be damaged. Finally, the invention provides a considerable cost reduction since the arrangement may be used with several size cables which requires only changing the size of non-expensive sockets 5, 6 and pressure discs 7a–d.

While the present invention has been disclosed in connection with a preferred embodiment thereof, it should be understood that there may be other embodiments which fall within the spirit and scope of the invention as defined by the following claims.

What is claimed is:

1. A cable entry connection of an electric power cable to a submersible machine, comprising:
   a submersible machine having a watertight shell (2);
   a cable (1) entering said shell (2) at an entry location;
   a collar (3) surrounding said cable (1) adjacent the entry location of said cable (1) into said shell (2);

bolt means (4) for securing said collar (3) to said shell (2);

two sockets (5) and (6) of an elastic material surrounding said cable (1), one socket (6) being mounted in said shell (2), and said other socket (5) being mounted in the collar (3);

a ring (8) of a rigid material positioned between said sockets (5) and (6), and adjacent a gap between said collar (3) and shell (2);

first and second pressure discs (7a-7b) positioned on the top and bottom of said socket (5), and third and fourth pressure discs (7c-7d) positioned on the top and bottom of said socket (6);

an o-ring (9) positioned in said collar (3) adjacent said shell (2); and said collar (3) being movable by said bolt means (4) towards and into contact with said shell (2) causing said sockets (5) and (6) to be compressed axially and expanded radially, whereby said cable (1) is secured and sealed.

2. The cable entry connection of claim 1 wherein said sockets (5) and (6) in the uncompressed condition have inner diameters which are somewhat larger than the nominal diameter of said cable (1).

3. The cable entry connection of claim 2 wherein said sockets (5) and (6) when compressed have inner diameters which are smaller than the nominal diameter of said cable (1).

* * * * *